US010883491B2

(12) United States Patent
Bangor et al.

(10) Patent No.: US 10,883,491 B2
(45) Date of Patent: Jan. 5, 2021

(54) PLUNGER LIFT STATE ESTIMATION AND OPTIMIZATION USING ACOUSTIC DATA

(71) Applicant: KELVIN, INC., Portola Valley, CA (US)

(72) Inventors: David Bangor, Diamond Bar, CA (US); Logan Duffy, San Francisco, CA (US); Adam Guetz, Mountain View, CA (US); Tim Jackson, San Francisco, CA (US); Robbie Pratt, Weatherford, OK (US); Peter Harding, Portola Valley, CA (US); Niall Wells, San Francisco, CA (US)

(73) Assignee: KELVIN INC., San Francisco, CA (US)

( * ) Notice: Subject to any disclaimer, the term of this patent is extended or adjusted under 35 U.S.C. 154(b) by 497 days.

(21) Appl. No.: 15/338,350

(22) Filed: Oct. 29, 2016

(65) Prior Publication Data

US 2018/0119692 A1 May 3, 2018

(51) Int. Cl.
| | |
|---|---|
| *F04B 49/22* | (2006.01) |
| *F04B 49/06* | (2006.01) |
| *F04B 47/02* | (2006.01) |
| *G01H 1/00* | (2006.01) |
| *E21B 47/008* | (2012.01) |

(Continued)

(52) U.S. Cl.
CPC ............ *F04B 49/22* (2013.01); *E21B 43/123* (2013.01); *E21B 47/008* (2020.05); *F04B 47/02* (2013.01); *F04B 47/12* (2013.01); *F04B 49/065* (2013.01); *G01H 1/00* (2013.01); *G01V 1/52* (2013.01); *F04B 2201/0202* (2013.01)

(58) Field of Classification Search
CPC ......... F04B 49/22; F04B 49/065; G01V 1/52; G01H 1/00; E21B 47/0007; E21B 43/123
See application file for complete search history.

(56) References Cited

U.S. PATENT DOCUMENTS

| 4,934,186 A | 6/1990 | McCoy |
|---|---|---|
| 6,241,014 B1 | 6/2001 | Majek et al. |

(Continued)

FOREIGN PATENT DOCUMENTS

EP    2910731 A1    8/2015

OTHER PUBLICATIONS

Martin W. Pedersen "HMM analysis of general state-space models", 2011 (Year: 2011).*

(Continued)

*Primary Examiner* — Charles G Freay
*Assistant Examiner* — Lilya Pekarskaya
(74) *Attorney, Agent, or Firm* — Young Law Firm, P.C.

(57) ABSTRACT

A method of probabilistically estimating a velocity of a plunger of a beam pump may comprise continuously monitoring well acoustics using a plurality of passive acoustic sensors attached to external structures of the beam pump; digitizing outputs of the plurality of passive acoustic sensors and sending the digitized outputs to a computing device for storage and processing; and using the digitized outputs of the plurality of passive acoustic sensors, estimating a probability of the velocity of the plunger using a hidden Markov model (HMM) to represent a probability of a position and the probability of the velocity of the plunger, the HMM comprising a state space model and an observational model.

12 Claims, 4 Drawing Sheets

(51) Int. Cl.
*E21B 43/12* (2006.01)
*F04B 47/12* (2006.01)
*G01V 1/52* (2006.01)

(56) References Cited

U.S. PATENT DOCUMENTS

| | | | |
|---|---|---|---|
| 6,634,426 B2* | 10/2003 | McCoy | E21B 43/121 |
| | | | 137/487 |
| 7,819,189 B1 | 10/2010 | Cosby | |
| 2004/0124012 A1* | 7/2004 | Dunlop | E21B 44/00 |
| | | | 175/57 |
| 2008/0162058 A1* | 7/2008 | Baklanov | F04B 51/00 |
| | | | 702/48 |
| 2011/0112997 A1* | 5/2011 | Sabe | G06N 20/00 |
| | | | 706/12 |
| 2012/0185220 A1 | 7/2012 | Shippen | |
| 2012/0193091 A1 | 8/2012 | Bender | |
| 2014/0090837 A1 | 4/2014 | Hedtke et al. | |
| 2014/0102698 A1 | 4/2014 | Bergman | |
| 2014/0114550 A1 | 4/2014 | Bohr et al. | |
| 2014/0114650 A1* | 4/2014 | Hershey | G10L 21/0232 |
| | | | 704/203 |
| 2014/0244552 A1 | 8/2014 | Liu et al. | |
| 2014/0305636 A1 | 10/2014 | Paulet | |
| 2015/0300159 A1* | 10/2015 | Stiles | E21B 47/0005 |
| | | | 367/82 |
| 2016/0061012 A1 | 3/2016 | Zimmerman, Jr. | |

OTHER PUBLICATIONS

International Search Report and Written Opinion dated Jan. 29, 2018 in PCT/US17/58858.
Analyzing & Troubleshooting Plunger Lifted Wells, Red Griffin, Lynn Rowlan, Gas Well De-Liquification Workshop, Denver Colorado, Feb. 28-Mar. 2, 2005.
Liquid and Gas Flow Monitoring in Plunger Lift, Wayne Hill, Nicholas Lima, Gas Well De-Liquification Workshop, Denver Colorado, Feb. 23-25, 2015.
Echometer Digital Well Analyzer brochure MS1913-001 Rev B, Dec. 1, 2008.
Echometer Well Analyzer Configurations, request for quote, Jim McCoy, date unknown.
Well Analyzer and TWM Software Operating Manual, Echometer Company, MS 1900 REV D, Oct. 9, 2008.
Echometer Plunger tracking and Fluid-Level Measurement, (C) 2008 Weatherford International Ltd.
Supplementary Search Report and Annex to the European Search Report and dated Apr. 30, 2020 in EP17864016 (7 pages).

* cited by examiner

PLUNGER LIFT STATE ESTIMATION AND OPTIMIZATION USING ACOUSTIC DATA

BACKGROUND

The disclosed embodiments relate to plunger lift systems used to remove fluid from a well bore in the earth and to methods, device and systems configured for monitoring and analytical diagnostics of such plunger lift systems.

DETAILED DESCRIPTION

Figure 1:
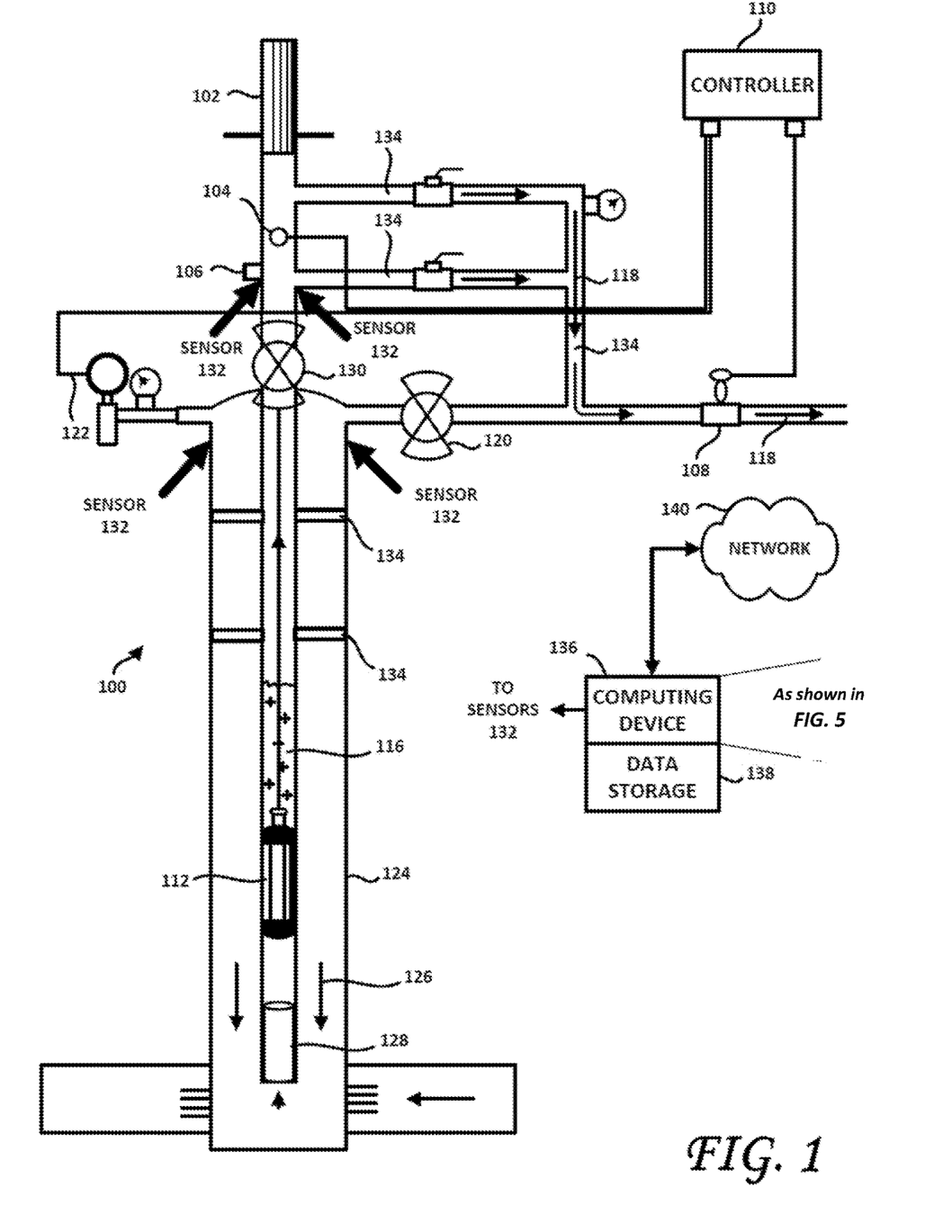
FIG. 1 is a diagram of a plunger lift system, and illustrates exemplary placement of acoustic transducers, according to one embodiment.

A plunger lift is a type of artificial lift mechanism used to remove liquids from a well. Regardless of the type of well, such as natural gas well, oil well, water well or other well type, the basic mechanics remain the same. As shown in FIG. 1, a plunger (sometimes referred to as a piston) 112 travels down a tubing 124 extending from the surface to the bottom of the well and then travels back up. The plunger 112 provides a seal between the liquid 116 and gas 126, provided from gas supply 122. This seal between, therefore, allows the liquid 116 (which is the resource, typically, hydrocarbons, sought to be extracted from the well) to be efficiently lifted out of the well bore under the well's own energy. Specifically, during a descent period, the plunger 116 falls down the tubing 124 toward the bumper spring/plunger stop 128 while the pressure of the gas 126 builds up in the casing and tubing annulus. Then, after the descent period, as the well is opened, the pressure in the tubing 124 is released and the stored casing gas 126 moves around the bottom of the tubing, pushing the plunger 112 and the slug of liquid 116 to the surface.

A flow line valve 130 may be selectively opened and closed. The flow line valve 130 may be opened while the plunger 112 descends down the tubing 124 and opened as the plunger 112 ascends towards the surface of the well. The operation of opening and closing the flow line valve 130 may, according to one embodiment, be optimized by determining the position and velocity of the plunger 112. A plunger sensor 104, also called a plunger arrival trip switch, may provide an indication of the timing of the arrival of the plunger 112 at the surface. A signal indicating such may be provided to a controller, as shown at 110 in FIG. 1. Advantageously, plungers 112 may be designed to include internal bypass plungers, which allow flow during plunger descent and do not require the motor valve 108 to be shut-in, and multi-stage plungers, which have multiple plungers and corresponding bumper springs placed in series along the tubing. The slug of liquid 116 brought up to the surface may then flow through motor valve 108, as suggested at 118.

One embodiment of a lift system to remove liquids and gas from wells monitors the position and velocity of the plunger 112 using one or more acoustic sensors 132. Such sensors 132 may comprise, for example, Polyvinylidene Fluoride (PVDF)-based acoustic transducers, and/or may include photo-diffraction microelectromechanical system (MEMS). An onsite computing device 136 may be provided to collect the signals from the acoustic sensors 132 and perform processing work thereon. One embodiment may utilize machine learning methods to accurately infer the velocity of the plunger 112, the size of the liquid slug 116, and/or other characteristics of the operation of the well. Persistent data storage 138 may also be provided, and configured to store sensor values, intermediate results and processed parameters. The computing device 136 may be coupled to a computer network 140, such as a local area network (LAN) and/or a wide area network (WAN) including, for example, the Internet. Some or all of the processing work on collected data may be carried out by the computing device 136. Alternatively, some or a portion of the data collected from the sensors 132 may be processed offsite, transmitted to some remote processing facility coupled to the computer network 140. The information derived from the processing of the data acquired from the sensors 132 may be formatted for presentation on a mobile device and/or a browser or similar environment.

In one embodiment, the computing device 136 may comprise a system on a chip (SoC) that includes a central processing unit (CPU), an on chip graphics processing unit (GPU) and on board memory ranging, for example, from a few hundred MB to several GB of random access memory (RAM). Secure Digital (SD) cards may be used to store a suitable operating system and program memory. The computing device 136 may comprise several Input/Output (I/O) interfaces such as some flavor of Universal Serial Bus (USB) slots, other I/O interfaces and an audio jack. Lower level output may be provided by a number of General Purpose IO (GPIO) pins that support common protocols like $I^2C$. Ethernet ports may be provided, as may be Wi-Fi 802.11n and/or near-field protocols such as Bluetooth. In one implementation, the computing device 136 may include a Raspberry Pi single board computer, from the Raspberry Pi Foundation.

Plunger Lift Acoustics

Plunger lift systems as shown at 100 in FIG. 1 may be used in wells drilled at depths of up to twenty thousand feet. The downhole part of a plunger lift system is a series of subterranean tubing segments extending down the well, connected by collars 134 at regular intervals (approximately every 30 feet, which spacing may vary between wells), enclosed in a casing pipe. As the plunger 112 travels up and down the well through the tubing 124, a characteristic audio signal is generated each time the plunger 112 passes a collar 134. The plunger 112 also makes characteristic sounds when the plunger 112 strikes fluid, the bottom bumper spring 128, the plunger catcher 106 at the top of the tubing 124, as well as traveling through narrow or damaged sections of tubing 124. In addition, the gas and liquid 116 flowing through the tubing 124 and flow lines at the surface generate recognizable acoustic signatures as well.

Sounds from down hole are transmitted through the tubing 124 and casing. Additionally, some sounds are generated that interfere with the measurement of the down-hole acoustic signals. These extraneous sounds may include acoustical noise generated at the surface from such sources as gas and/or liquid flows, valves opening and closing, wind, rain, chemical treatments, compressors, and other ambient noise, which can collectively interfere with measurement and interpretation of down hole-acoustic signals by significantly raising the noise floor of the system. One embodiment is configured to provide an accurate estimation of the velocity of the plunger 112 within the downhole in the presence of significant noise.

Acoustic signals from down-hole are attenuated as they travel up the tubing/casing. In practice, this means that there is an effective "acoustical limit" for various types of noises emitted down-hole, depending on their magnitude and frequency and also depending upon the characteristics of the well and microphone system. The "acoustic limit" may be defined, therefore, as the maximum depth at which a signal from a sound-emitting down-hole can be reliably distinguished from noise by an acoustic sensor at the surface. For down hole plunger noises, such as tubing collar, fluid or bottom strikes, this acoustic limit can be as little as 500 ft.—which may be a fraction of the total depth of the well.

Hardware and Data Collection

According to one embodiment, direct monitoring of plunger lift well operation may be carried out by placing multiple sensors 132, such as contact microphones, at the surface of the well to collect acoustic data. In one embodiment, acoustic sensors attached (e.g., magnetically) to external structures of the beam pump and/or well are configured for continuous monitoring of acoustic events caused by the plunger moving within the well and fluid, gases and sediment being lifted to the surface of the well. Through such continuous monitoring of well acoustics, insights into the operation thereof may be derived, as detailed hereunder. In one embodiment, the continuous monitoring of the well acoustics may be carried out using passive acoustic sensors, as opposed to active sensors that transmit an acoustic signal and record the reflection thereof. As also shown in FIG. 1, sensors 132 such as microphones may also be placed on the tubing 124, casing, wellhead plunger catcher 106, flow line, and valves. Indeed, acoustic sensors 132 may be disposed within the well and outside thereof, meaning that the operation of the well need not be disturbed when placing the sensors. As shown in FIG. 1, more than one microphone may be placed in a single location or close together to strengthen the signal to noise ratio by combining the signals.

According to one embodiment, such microphones or other transducers maybe be of various types, such as piezoelectric, condenser, optical, and/or high sensitivity accelerometer. An analog-to-digital converter (ADC) of an appropriate type may be used to convert the analog time-varying signals output from the transducers signal into digital format, at a sampling rate of, for example, at least 20 kHz and more typically at least 44 kHz. Filtering may be carried out to attenuate signals outset of the frequency bands of interest and to isolate the audio frequency signals that may be indicative of the parameter(s) sought to be measured. The digitized and filtered signals may then be sent to the computing device 140, to an onsite storage 138 and/or to remote storage coupled to the computer network 140.

Processing and Analytics

According to one embodiment, using the acoustic data gathered by the data acquisition system (including the sensors 132, local and/or remote computing device 136 and local and/or remote data storage 140), an analytics system according to one embodiment may be configured to sense and record plunger events, to classify these sensed and recorded plunger events and to estimate quantities representing physical characteristics of the plunger system. These physical characteristics may include, according to one embodiment, plunger ascent and descent velocities and the position of the plunger 112 within the downhole. Such an analytics system may also be configured to estimate the volume of the liquid slug 116 brought up by the plunger 112 by analyzing the flow noise for the presence of liquid immediately before the plunger 112 strikes the wellhead plunger catcher 106. It is to be understood that the liquid slug 116, within the present context, may comprise a gaseous fraction (including methane, for example), water, oil and sediments. Such analytics may also be used to derive an estimate of the gas-water-oil-sediment content of the slug 116, based upon, for example, characteristic acoustic signatures.

According to one embodiment, the analysis system may be configured to recognize each acoustic event that occurs in the plunger lift system by recognizing the characteristic acoustic signatures thereof, and by using the context and estimated state of the plunger lift system to help identify ambiguous events. To analyze the acoustic signals generated by the acoustic sensors 132, the processing and analytics system (including the computing device 136 and/or any offsite computing and data storage facilities), according to one embodiment, may employ spectral decomposition techniques, including windowed discrete Fourier transforms (DFT) or continuous wavelet transforms (CWT) or similar methods to perform a spectrogram analysis in the frequency domain, as opposed to a time-domain analysis of the raw digitized and filtered acoustic sensor data. Other features of the sensed and recorded audio data may be computed, such as the magnitude, standard deviations and/or combinations thereof, across spectral bands. Then, the transformed data may be run through processes that employ physical modeling, machine learning, artificial intelligence, and/or Bayesian statistical methods to generate probabilities of the occurrence of each event.

Once the probabilities of plunger events are identified, the analytics system, according to one embodiment, may estimate various properties of the plunger system. Knowing the relative distances between downhole acoustic features and having identified the acoustic events corresponding to the plunger 112 striking or otherwise interacting with those features allows the estimation of velocity of the plunger 112, within the acoustic limit. To estimate the velocity of the plunger 112 when the plunger is below the acoustic limit, a statistical model of plunger travel through the tubing that incorporates current and prior measurements of plunger velocity and liquid accumulation rates for the specific well may be used. Confidence intervals of plunger velocity may also be computed.

Liquid slug levels may be determined by looking for elevated signal levels in specific frequency bands immediately before the plunger 112 strikes the wellhead plunger catcher 106. Indeed, according to one embodiment, by determining when the noises rise above a threshold, the total volume of liquid in the slug 116 may be determined by multiplying the estimated plunger depth at the point at which liquid is first recognized by the known cross-sectional surface area of the tubing 124.

Recognition of plunger system events also provides a probabilistic inference of the current state the plunger lift system, such as whether the plunger 112 is descending, ascending, at bottom or at top of the well. The system can identify these states by identifying the following acoustic events: motor valve 108 open/close, the arrival of the plunger 112 at the wellhead plunger catcher 106, gas/liquid flow noises, the acoustical signature of the plunger 112 striking the collars 134, the acoustic signature of the plunger 112 striking fluid and the acoustical signature of the plunger 112 striking the bottom of the well (such as when striking the bottom bumper spring 128). The current state of the plunger 112 may be estimated probabilistically, according to one embodiment, through a hidden Markov model (HMM), a statistical Markov model in which the plunger lift system being modeled is assumed to be a Markov process with unobserved (hidden) states.

Plunger Lift Optimization Analysis and Estimation of Fluid Slug Size

According to one embodiment, plunger lift optimization analysis provides sufficient information regarding the plunger's position and velocity to provide more accurate times for the plunger 112 descent, reaching the bottom of the downhole and ascent periods. Furthermore, a similar analysis may be applied when the well's motor valve 108 is opened and the plunger 112 makes its ascent back up to the surface of the well. Monitoring the upward position and velocity of the plunger 112 can help to prevent damage when plunger's velocity is too great. This analysis may also provide information that allows further machine learning identification of the fluid slug size.

According to one embodiment, to compute the size of the fluid slug size, the time of arrival of the plunger 112 at the surface of the well may be identified. According to one embodiment, this arrival time may be identified as corresponding to the timing of the largest magnitude noise detected by one or more of the sensors 132 after the opening of the motor valve 108. Motor valve 108 opening time may be determined from communication with the controller 110. One embodiment utilizes a machine-learning classifier such as a support vector machine (SVM), given labeled samples from similar plunger lifts. In machine learning and statistics, classification is the problem of identifying to which of a set of categories (sub-populations) a new observation belongs, on the basis of a training set of data containing observations (or instances) whose category membership is known. In the present context, such a machine-learning classifier may be fed plunger lift training data (acoustical data sequences, each of which may be assigned a class such as "plunger lift"), to enable it to recognize the acoustical signature of plunger lifts and to determine the probability that a certain acoustical event is likely to be, in fact, a plunger lift, as opposed to other acoustical events. Indeed, such a classifier may be effective in distinguishing plunger arrival times from other loud noises that may be mistaken for arrival events, including acoustical events related to such variables such as pressure, flow, and differential pressure. Other methods, such as magnetic arrival sensors, may be used to determine and/or confirm the arrival time of the plunger 112 at the surface or to contribute, in combination with the machine learning classifier, to the determination of the arrival time of the plunger 112 at the surface of the well.

Figure 2:
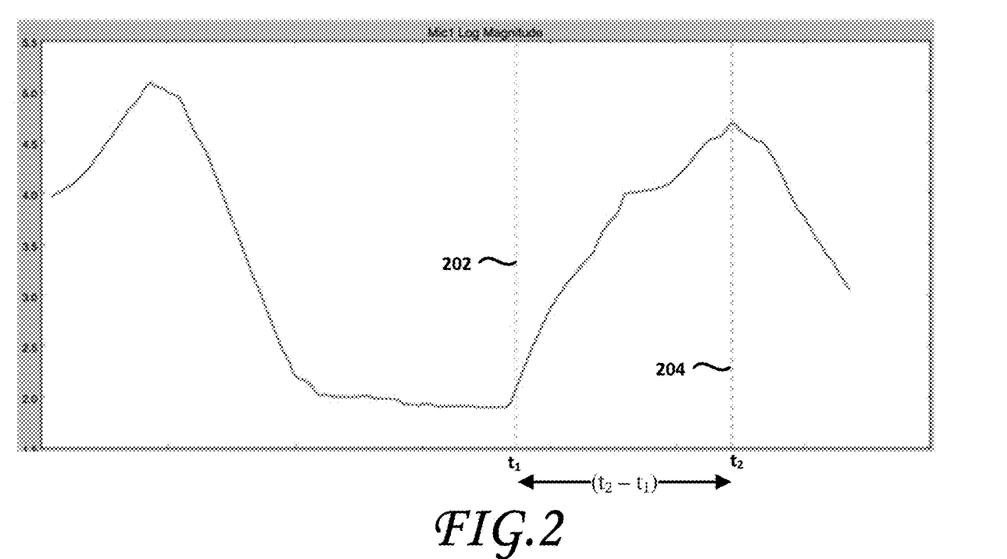
FIG. 2 is a graph showing plunger acoustical noise over time, to aid in the determination of the arrival time of the plunger at the surface, according to one embodiment.

FIG. 2 shows the manner in which plunger arrival time may be determined, according to one embodiment. As shown, the log of the magnitude of the output of a contact microphone-type acoustical sensor 132 on the well may be plotted, on just over 1 cycle. The leftmost dotted line 202 at the $t_1$ timestamp represents the time of the opening of the motor valve 108, which may be determined from the controller 110. As shown, the "noise" begins to rise at time $t_1$ as fluid flows through the tubing. The second vertical line 204 at the $t_2$ timestamp represents the loudest moment in the time period immediately after the motor valve 108 has opened, which is when the plunger 112 arrives at the top of the well. The difference in the timestamps $(t_2-t_1)$ between these two acoustical events divided by distance travelled by the plunger within the well between these two events gives an estimate of plunger ascent velocity, which may be compared to measurements from the controller 110.

The amount of time that the measured noise levels on the tubing were above pre-determined magnitudes (calibrated for each well) may then be observed, applying filters to the accelerometer data based on observed frequencies characteristic of liquid noise. A machine-learning classifier to distinguish periods of liquid flow from periods of gas flow or other ambient noises that may be mistaken for liquid flow.

Figure 3:
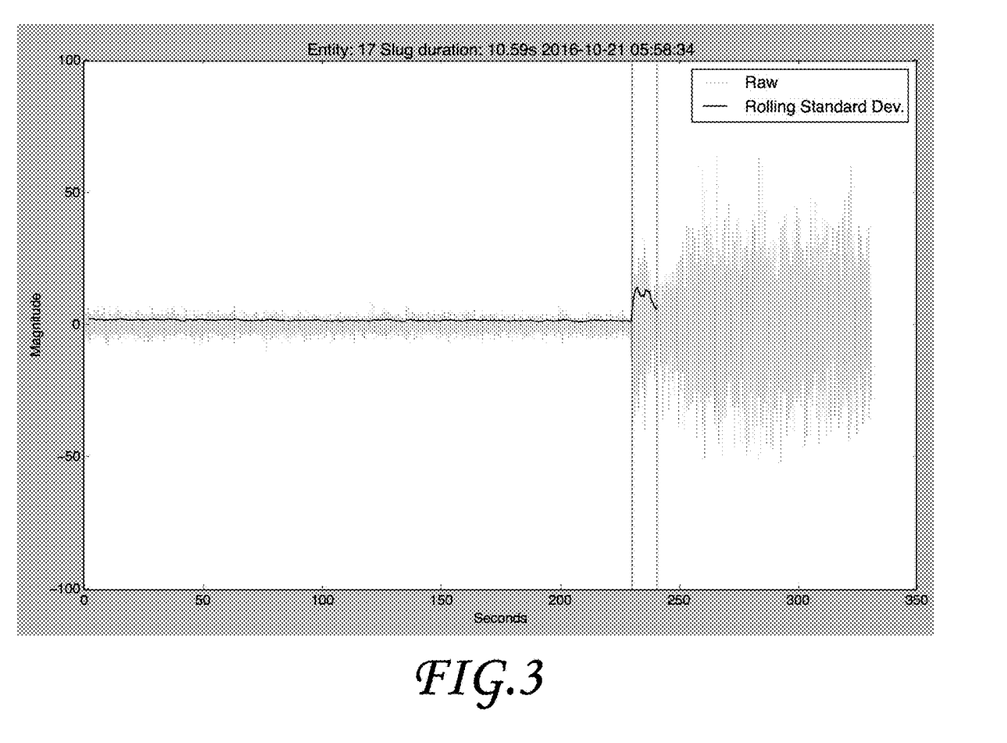
FIG. 3 is a graph, showing the raw Root-Mean Square (RMS) microphone data and the rolling standard deviation of the raw RMS microphone data over time, in seconds, on the tubing of a plunger lift, according to one embodiment.

FIG. 3 is a graph, showing the raw Root-Mean Square (RMS) microphone acoustic data and the rolling standard deviation of the raw RMS microphone data over time, in seconds, on the tubing of a plunger lift, according to one embodiment. Indeed, plotted in FIG. 3 is the raw RMS microphone data acquired from the acoustical sensors 132 (e.g., microphones) over time, in seconds, on the tubing of a plunger lift, and the rolling standard deviation of the raw RMS microphone data. The two vertical lines, from left to right, denote the start of the liquid slug noise and the estimated arrival time of the slug at its highest point within the well. In this example, the difference between the timing of these two vertical lines is denoted as slug duration and is shown at 10.50 sec in duration. Slug height may then be determined by estimating the plunger position at the time of the start of the liquid slug noise. The volume of the liquid slug may then be estimated by multiplying the determined slug height by the known internal cross-sectional surface area of the pipe.

Plunger Ascent/Descent Velocity

To estimate the velocity of the plunger, one embodiment uses a hidden Markov model (HMM) to represent the position and velocity of the plunger and the observed acoustic data. The HMM of the plunger position and velocity may comprise a state space model, detailed below and an observation model, also detailed below. For a given set of T time intervals, the set of state variables may be represented, according to one embodiment, as $$X=\{x_0, \ldots, x_T\}$$

and the set of observation variables may be represented as $$Y=\{y_0, \ldots, y_T\}$$

For a given set of observations and a set of possible plunger states, the conditional probability function of the states X given Y under the HMM may be computed, using Bayes' Rule, as $$P(X \mid Y) = \frac{P(Y \mid X)P(X))}{P(Y)}$$

The maximum likelihood estimates of plunger position and velocity $X_{MLE}$ may be found by maximizing the conditional probability function P(X|Y). Alternatively, Bayesian statistical methods may be used on this model to obtain confidence intervals and other estimates of uncertainty. Bayesian methods include an expectation-maximization algorithm to find the maximum a posteriori estimates of the model's uncertainty parameters, or a Bayes estimator to minimize the posterior expected loss.

Accordingly, one embodiment is a method of probabilistically estimating a velocity of a plunger of a beam pump. Such a method may comprise continuously monitoring well acoustics using a plurality of passive acoustic sensors attached to external structures of the beam pump; digitizing and filtering outputs of the plurality of passive acoustic sensors and sending the digitized and filtered outputs to a computing device for storage and processing; and using the digitized and filtered outputs of the plurality of passive acoustic sensors, estimating a probability of the velocity of the plunger using a hidden Markov model (HMM) to represent a probability of a position and the probability of the velocity of the plunger, the HMM comprising a state space model and an observational model.

According to one embodiment, the state space model comprises a set of state space variables over a time interval and wherein the observational model comprises a set of observation variables over the time interval and wherein a probability of states under the HMM is computed using Bayes' Rule. The method may further comprise determining a maximum likelihood estimate of plunger velocity using a conditional probability function. In one embodiment, the state space model is a function of plunger position at time t, plunger velocity at time t and a terminal velocity of the plunger. In one implementation, the observational variables may be inputted into a support vector machine trained on known plunger acoustic events. Such known plunger acoustic events may be determined by thresholding acoustic magnitudes relative to background noise levels, for example. An acoustic event classification algorithm may be evaluated to determine whether a subset of the digitized outputs correspond to a predetermined acoustical event caused by the plunger. In one embodiment, the acoustic event classification algorithm may be configured to output ranging between 0 and 1 that represents an estimated probability that the predetermined acoustic event generated the subset of the digitized outputs. In one embodiment, the set of observation variables are modeled as a sum of a first lognormal random variable and a second lognormal random variable and a constant. The method may further comprise determining a volume of a liquid slug raised to a surface of the well by the plunger using the estimated probability of the velocity of the plunger. Determining the volume of the liquid slug, in one embodiment, may comprise detecting elevated acoustic signal levels in predetermined frequency bands immediately before the plunger is estimated to reach a predetermined structure of the beam pump, based upon the estimated probability of the velocity of the plunger. According to one embodiment, the volume of the liquid slug may be related to an estimated plunger depth at a point at which liquid is first recognized multiplied by a known cross-sectional surface area of a tubing in which the plunger travels.

Exemplary implementation details on the above-described embodiments are given below.

State Space Model

The plunger 112 follows Newton's second law of motion. The basic state of the plunger 112 at time t may be represented as $$x_t = \begin{bmatrix} x_t \\ v_t \end{bmatrix}$$

where $x_t$ and $v_t$ are the position and velocity of the plunger 112, respectively.

A simple model of forces operating on the plunger 112 include the force of gravity and a drag force as the plunger 112 falls through the fluid medium inside the tube. At the terminal velocity of the plunger, the drag is equal to the force of gravity:

$$mg = \frac{1}{2}\rho v_T^2 A C_d \Rightarrow v_T = \sqrt{\frac{2\,mg}{ACd}}$$

where m is the mass of the plunger 112, g is earth's gravity, ρ is the density of the fluid medium, υ is the terminal velocity of the plunger 112, A is the cross-sectional surface area of the plunger 112, and $C_d$ is the coefficient of drag. Furthermore, m, g, ρ, A and $C_d$ are constants that are either known a priori, can be measured, or can be estimated through observations.

When the plunger 112 is falling through gas, according to the ideal gas law, density of the gas will be proportional to pressure divided by temperature.

$$\rho \propto P/T$$

We may then define the constant $C_d$ as the inverse square root of this ideal gas law's proportional constant, times $$\sqrt{\frac{2\,mg}{ACd}}$$

This implies that, all else being equal, terminal velocity $v_T$ will increase/decrease with the inverse square root of the pressure, according to the following relationship:

$$v_T = c_T\sqrt{T/P}$$

Then, by implementing this relationship into the state space representation along with a transition matrix F, at time t, we have $$x_t = \begin{bmatrix} x_t \\ v_t \\ c_T\sqrt{T/P} \end{bmatrix} \text{ and}$$

$$F = \begin{bmatrix} 1 & dt & 0 \\ 0 & (1-dt) & dt \\ 0 & 0 & 1 \end{bmatrix},$$

where dt is the time step between t and t−1.

$X_t$ is the plunger state at time t, and F is the state transition matrix.

The state space at time t may be represented as $$x_t = Fx_{t-1} + E_t$$

where $E_t$ is a random variable representing random error in the state vector. For simplicity, the state error may be assumed to be independently distributed Normal random variables, $$E_t = \begin{bmatrix} N(0, \sigma_x^2) \\ N(0, \sigma_v^2) \\ N(0, \sigma_\rho^2) \end{bmatrix}.$$

Other distributions may also be used to represent state error. The probability that the plunger will be in state $x_t$ given that it is in state $x_{t-1}$, $$P(x_t|x_{t-1}) = P(E_t = x_t - Fx_{t-1}),$$

can be computed through the probability density function of $E_t$.

Observational Model

It is recalled that the tubing collars 134 are spaced regularly apart, with a 30 ft. separation between collars 134 being standard. As the plunger 112 travels through the tubing, it typically strikes the tubing collars 134 resulting in a loud 'ping' noise. This sound travels up the tubing and is recorded by stationary acoustic sensors 132. It is assumed that the sound level of the ping at the sensor is attenuated as a function of distance from the ping and delayed by distance divided by the speed of sound in the media through which it travels (fluid, gas and/or air). In addition to the sound, other techniques may be employed to identify these plunger—collar strikes, such as simple thresholding on the magnitudes of sharp deviations from background noise levels at specific frequency bands. In one embodiment, these techniques produce features that may be used as inputs to statistical classification methods, such as a support vector machine (SVM), that are trained on a sample of known plunger acoustic events. Other classification algorithms may also be used.

Figure 4:
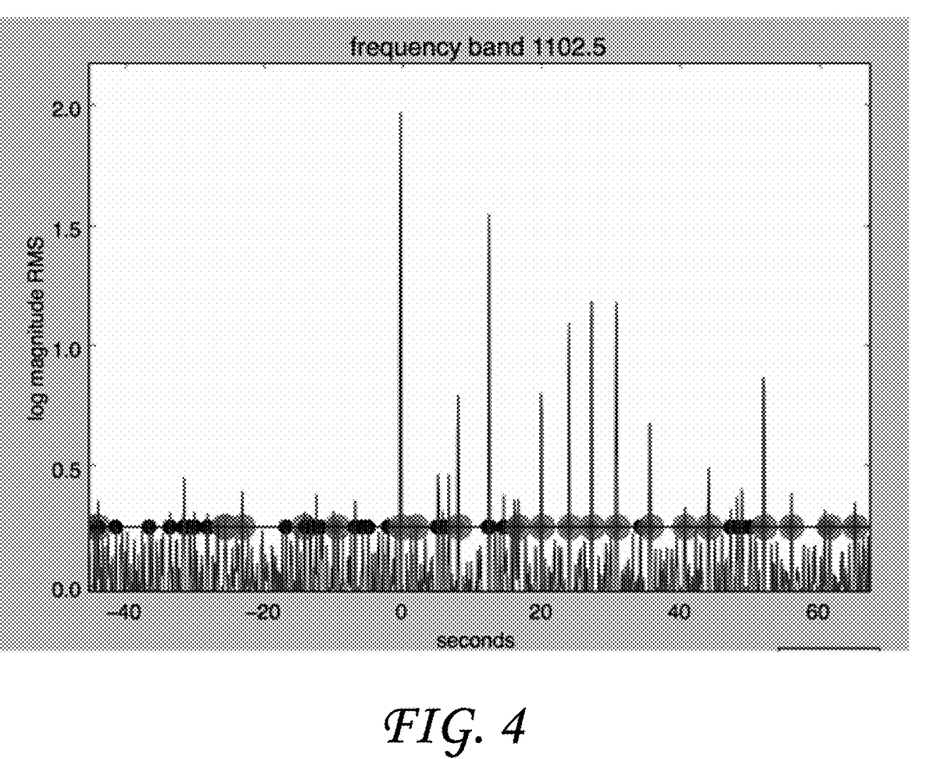
FIG. 4 is a frequency domain plot of frequency vs. amplitude, showing thresholding based on noise levels with a bandpass filter centered at 1102.5 kHz, according to one embodiment.

FIG. 4 shows thresholding based on noise levels with a bandpass filter centered at 1102.5 kHz, according to one embodiment. This is one example of a feature that may be used as an input into the classification algorithm to distinguish acoustic events such as collar ping sounds from other noise sources.

According to one embodiment, an acoustic event classification algorithm may be used to determine that an observed acoustical event was, in fact, caused by the plunger 112 impinging upon a collar such as shown at 134 in FIG. 1. Such a collar ping classification algorithm may output a number $\Gamma$ between 0 and 1 that represents the estimated probability that a collar ping generated the observed noise pattern. Let $\gamma t = \text{Logit}(\Gamma)$. We can model $\gamma t$ as the sum of two random variables $C_t$ and $Z_t$ plus a constant $b_0$ as $$\gamma_t = b_0 + C_t + Z_t,$$

where $C_t$ represents the event that a predetermined acoustic event such as a collar ping produces a sound correctly recognized by the classification algorithm, and $Z_t$ represents the event that background noise produces a sound incorrectly classified as the predetermined acoustic event such as a collar ping. According to one embodiment, these variables may be represented as Lognormal random variables such as:

$$C_t = b_c e^{x_t c_t} \exp N(0, \sigma_c^2) \delta(x_t \bmod 3)$$

$$Z_t = b_z \exp N(0, \sigma_z^2)$$

In this case, we can compute the probability distribution functions of $C_t$ and $Z_t$; that is, $P(C_t = y | x_t)$ and $P(Z_t = y | x_t)$, respectively, as follows:

$$P(Z_t = y | x_t) = P(b_z \exp N(0, \sigma_z^2) = y)$$
$$= P(N(0, \sigma_z^2) = \log(y/b_z))$$
$$= \frac{1}{\sigma_z \sqrt{2\pi}} \exp - (\log(y/b_z))/2\sigma_z^2$$

$$P(C_t = y | \delta(x_t \bmod 30) = 1) = P(b_c e^{-x_t c_c} \exp N(0, \sigma_c^2) = y)$$
$$= P(N(0, \sigma_c^2) = \log(y/b_c) + x_t c_c)$$
$$= \frac{1}{\sigma_c \sqrt{2\pi}} \exp - (\log(y/b_c) + x_t c_c)/2\sigma_c^2$$

$$P(C_t = y | \delta(x_t \bmod 30) = 0) = 1 \text{ if } y = 0 \text{ else } 0$$

Other distributions are also possible. To compute the probability of a predetermined acoustic event observation such as a collar ping observation for a given time t, according to one embodiment, the following relationship may be used $$P(\gamma_t = z | x_t) = P(b_0 + C_t + Z_t = z | x_t)$$
$$= \int_{-\infty}^{\infty} P(C_t = y | x_t)$$
$$P(Z_t = z - y - b_0 | x_t) dy$$

We can numerically integrate this 1D integral using Quadrature methods, such as the trapezoidal method.

Solving the Hidden Markov Model to Derive Plunger Velocity

Figure 5:
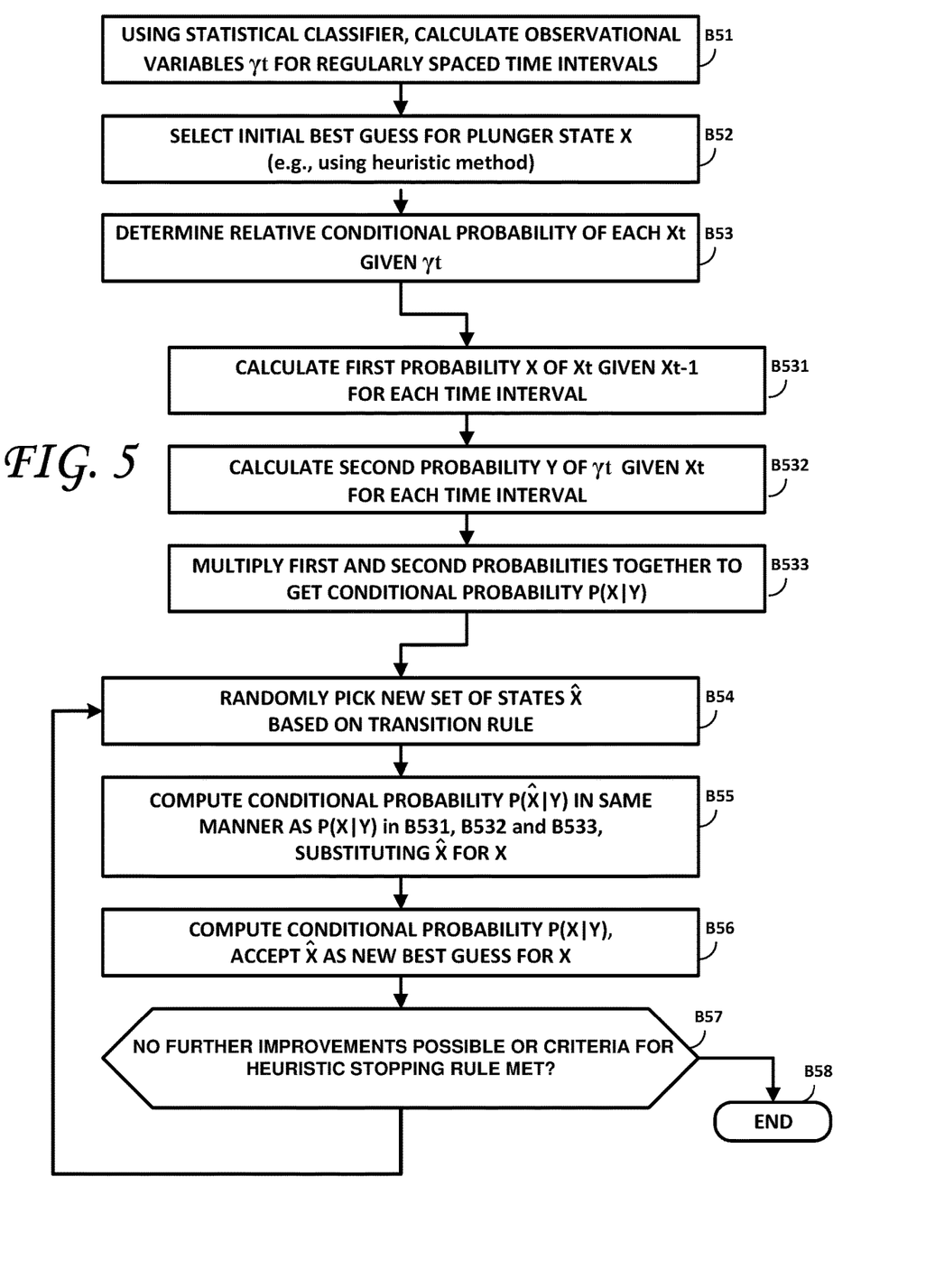
FIG. 5 is a flowchart of a method of estimating position and velocity of a plunger using a state-space model and an observation model, according to one embodiment.

Given a set of acoustic recordings over a time period, and a statistical classifier trained to recognize collar pings, it is desired to estimate the position and velocity of the plunger 112 using the state-space and observation models described above. FIG. 5 is a flowchart of a method of estimating position and velocity of a plunger using a state-space model and an observation model, according to one embodiment. Indeed, one embodiment is configured to find the maximum likelihood estimator $X_{ML}$ using an iterative algorithm as follows:

1) Use a statistical classifier to calculate observational variables $\gamma t$ for regularly spaced time intervals, as shown at B51;
2) Pick an initial best guess of the plunger state X as shown at B52 using, for example, a heuristic method;
3) Calculate the relative conditional probability of each $x_t$ given $\gamma t$ as called for by B53. To do so,
    a) Calculate the probability of $x_t$ given $x_{t-1}$ for each time interval, as shown at B531
    b) Calculate, as called for at B532, the probability of $\gamma t$ given $x_t$ for each time interval;
    c) Multiply the probabilities together to get the conditional probability P(X|Y), as shown at B533;
4) Block B54 calls for Randomly picking a new set of states $\hat{X}$ based on a transition rule. Then, as shown at B55, the conditional probability P($\hat{X}$|Y) may be computed in an identical fashion as in block B53, except we are computing for $\hat{X}$ instead of X. If the P($\hat{X}$|Y) is greater than P(X|Y), then accept $\hat{X}$ as the new best guess X, otherwise accept $\hat{X}$ with conditional probability P($\hat{X}$|Y)/P(X|Y) as shown at B56. As shown at B57, the method may iteratively return to B54 until no further improvements are possible or the criteria of a heuristic stopping rule has been met, whereupon the method ends at B58. Other algorithms for computing maximum likelihood $\text{argmax}_X P(X|Y)$ are possible.

An example of an initial best guess heuristic at B52 would be to assume that every $\gamma t$ above a given threshold corresponds to specific acoustic events, such as collar pings, there are no missed collar pings in the observed time period, the plunger position is interpolated linearly between the corresponding known position and the plunger velocity is computed by differentiating the position of the plunger. An example of a heuristic transition rule at B54 is for to pick a $\gamma t$ at random, and remove its inclusion as a known collar ping, or to pick an adjacent random pair of assumed collar pings and assume that there was a missed collar ping in between. An example of a heuristic stopping rule at B57 is to stop after a fixed number of time steps N.

One embodiment is a system that may comprise, according to one embodiment, a beam pump comprising a plunger configured to travel in a well and a plurality of passive acoustic sensors attached to external structures of the beam pump, the plurality of passive acoustic sensors being configured to continuously monitor acoustical events in the well, as shown and described relative to FIG. 1. One or more ADCs and filter(s) may be provided, which may be configured to digitize and filter, respectively, outputs of the plurality of passive acoustic sensors. A beam pump controller, such as shown at 110 in FIG. 1, may be configured to control one or more motor valves (such as 108, for example) that controls the plunger 112. A computing device 136 may be provided, with the computing device 136 being configured to receive, store and process the digitized and filtered outputs to a computing device by estimating a probability of the velocity of the plunger using a HMM to represent a probability of a position and the probability of the velocity of the plunger. As described above, the HMM may comprise a state space model and an observational model. According to one embodiment, the computing device may be configured to send at least the estimated probability of the velocity of the plunger 112 to the beam pump controller 110 to enable the beam pump controller 110 to control opening and closing of the motor valve (e.g., 108) based on at least the estimated probability of the velocity of the plunger, within a determined confidence level.

According to one embodiment, the state space model may comprise a set of state space variables over a time interval and the observational model may comprise a set of observation variables over the time interval. The probability of states under the HMM may be, according to one embodiment, computed using Bayes' Rule.

The set of state space variables over the time interval may comprise $X=\{x_0, \ldots, x_T\}$ and the set of observation variables over the time interval may comprise $Y=\{y_0, \ldots, y_T\}$. The probability of states under the HMM may be computed, according to one embodiment, as $$P(X\mid Y) = \frac{P(Y\mid X)P(X))}{P(Y)}.$$

In one embodiment, the computing device may be further configured to determine the maximum likelihood estimate of plunger velocity using a conditional probability function. The state space model may be a function of plunger position at time t, plunger velocity at time t and the terminal velocity of the plunger. According to one embodiment, the computing device 136 may be further configured to input the observational variables into a support vector machine trained on known plunger acoustic events. One non-limiting example of such known plunger acoustic events is a plunger reaching the surface of the well or the plunger striking a tubing collar. In one embodiment, the computing device 136 may be further configured to identify such known plunger events using thresholding of magnitudes relative to background noise levels. The computing device may be further configured (e.g., programmed, provided with custom ASIC or the like) to evaluate an acoustic event classification algorithm to determine whether a subset of the digitized and filtered outputs correspond to a predetermined acoustical event caused by the plunger. The acoustic event classification algorithm is configured to output a number that ranges between 0 and 1 and that represents the estimated probability that the predetermined acoustic event, in fact, generated the subset of the digitized and filtered outputs. The set of observation variables may be modeled, according to one embodiment, as a sum of a first lognormal random variable and a second lognormal random variable and a constant. The volume of a liquid slug raised to a surface of the well by the plunger may also be determined by the computing device 136 using the estimated probability of the velocity of the plunger. The volume of the liquid slug may be further determined by detecting elevated acoustic signal levels in predetermined frequency bands immediately before the plunger is estimated to reach a predetermined structure of the beam pump (such as, for example, the plunger catcher 106 at the top of the tubing 124), based upon the estimated probability of the velocity of the plunger. The volume of the liquid slug may be estimated, based on the estimated plunger depth at a point at which liquid is first recognized multiplied by a known cross-sectional surface area of a tubing in which the plunger travels.

Those of ordinary skill would appreciate that the various illustrative logical blocks, modules, and algorithm parts described in connection with the examples disclosed herein may be implemented as electronic hardware, computer software, or combinations of both. Furthermore, the embodiments can also be embodied on a non-transitory machine readable medium causing a processor or computer to perform or execute certain functions. To clearly illustrate this interchangeability of hardware and software, various illustrative components, blocks, modules, circuits, and process parts have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosed apparatus and methods.

The parts of a method or algorithm described in connection with the examples disclosed herein may be embodied directly in hardware, in a software module executed by a processor, or in a combination of the two. The parts of the method or algorithm may also be performed in an alternate order from those provided in the examples. A software module may reside in RAM memory, flash memory, ROM memory, EPROM memory, EEPROM memory, registers, hard disk, a removable disk, an optical disk, or any other form of storage medium known in the art such as Solid State Drives (SSDs). An exemplary storage medium is coupled to the processor such that the processor can read information from, and write information to, the storage medium. In the alternative, the storage medium may be integral to the processor. The processor and the storage medium may reside in an Application Specific Integrated Circuit (ASIC).

While certain embodiments of the disclosure have been described, these embodiments have been presented by way of example only, and are not intended to limit the scope of the disclosure. Indeed, the novel methods, devices and systems described herein may be embodied in a variety of other forms. Furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure. For example, those skilled in the art will appreciate that in various embodiments, the actual physical and logical structures may differ from those shown in the figures.

Depending on the embodiment, certain steps described in the example above may be removed, others may be added. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

The invention claimed is:

1. A method of probabilistically estimating a velocity of a plunger of a beam pump of a well, the method comprising:
continuously monitoring well acoustics using a plurality of passive acoustic sensors attached to external structures of the beam pump;
digitizing and filtering outputs of the plurality of passive acoustic sensors and sending the digitized and filtered outputs to a computing device for storage and processing;
using the digitized and filtered outputs of the plurality of passive acoustic sensors, estimating, in the computing device, a probability of the velocity of the plunger using a hidden Markov model (HMM) to represent a probability of a position and the probability of the velocity of the plunger, the HMM comprising a state space model and an observational model, and
determining, by the computing device, a volume of a liquid slug raised to a surface of the well by the plunger using the estimated probability of the velocity of the plunger;
sending at least the estimated probability of the velocity of the plunger to a controller of the beam pump;
controlling, by the controller, opening and closing of a motor valve through which the liquid slug raised to the surface flows, based on the at least the estimated probability of the velocity of the plunger.

2. The method of claim 1, wherein the state space model comprises a set of state space variables over a time interval, and wherein the observational model comprises a set of observation variables over the time interval, and wherein a probability of states under the HMM is computed using Bayes' Rule.

3. The method of claim 2, wherein the set of state space variables over the time interval comprises $X=\{x_0, \ldots, x_T\}$, and wherein the set of observation variables over the time interval comprises $Y=\{y_0, \ldots, y_T\}$, and wherein the probability of states under the HMM is computed as $$P(X|Y) = \frac{P(Y|X)P(X))}{P(Y)}.$$

4. The method of claim 2, further comprising determining a maximum likelihood estimate of plunger velocity using a conditional probability function.

5. The method of claim 1, wherein the state space model is a function of plunger position at time t, plunger velocity at time t and a terminal velocity of the plunger.

6. The method of claim 2, further comprising inputting the observational variables into a support vector machine trained on known plunger acoustic events.

7. The method of claim 6, further comprising identifying the known plunger events using thresholding of magnitudes from background noise levels.

8. The method of claim 1, further comprising evaluating an acoustic event classification algorithm to determine whether a subset of the digitized outputs correspond to a predetermined acoustical event caused by the plunger.

9. The method of claim 8, wherein the acoustic event classification algorithm is configured to output a number $\Gamma$ that ranges between 0 and 1 and represents an estimated probability that the predetermined acoustic event generated the subset of the digitized outputs.

10. The method of claim 1, wherein the set of observation variables is modeled as a sum of a first lognormal random variable and a second lognormal random variable and a constant.

11. The method of claim 1, wherein determining the volume of the liquid slug comprises detecting elevated acoustic signal levels in predetermined frequency bands immediately before the plunger is estimated to reach a predetermined structure of the beam pump, based upon the estimated probability of the velocity of the plunger.

12. The method of claim 11, wherein the volume of the liquid slug is related to an estimated plunger depth multiplied by a known cross-sectional surface area of a tubing in which the plunger travels, the plunger depth being estimated at a point at which liquid is first recognized.

* * * * *